US012644576B2

(12) United States Patent
Saarnio et al.

(10) Patent No.: US 12,644,576 B2
(45) Date of Patent: Jun. 2, 2026

(54) OPTICAL DEVICE FOR MODIFYING A LIGHT DISTRIBUTION AND A METHOD FOR MANUFACTURING THE SAME

(71) Applicant: LEDIL OY, Salo (FI)

(72) Inventors: Olli Saarnio, Turku (FI); Matti Vuola, Salo (FI)

(73) Assignee: LEDIL OY, Salo (FI)

( * ) Notice: Subject to any disclaimer, the term of this patent is extended or adjusted under 35 U.S.C. 154(b) by 3 days.

(21) Appl. No.: 18/865,270

(22) PCT Filed: Jun. 1, 2023

(86) PCT No.: PCT/FI2023/050309

§ 371 (c)(1),
(2) Date: Nov. 12, 2024

(87) PCT Pub. No.: WO2023/237811

PCT Pub. Date: Dec. 14, 2023

(65) Prior Publication Data

US 2025/0327560 A1 Oct. 23, 2025

(30) Foreign Application Priority Data

Jun. 7, 2022 (FI) ...................................... 20225496

(51) Int. Cl.
*F21V 7/00* (2006.01)

(52) U.S. Cl.
CPC .................................. *F21V 7/0091* (2013.01)

(58) Field of Classification Search
CPC ........ F21V 7/0091; F21V 31/005; F21V 5/04; F21V 14/06; F21V 17/101; F21V 17/06; F21V 17/002; F21V 3/02
See application file for complete search history.

(56) References Cited

U.S. PATENT DOCUMENTS 6,607,286 B2 * 8/2003 West .................. G02B 19/0061 362/255
9,182,101 B2 * 11/2015 Nakamura ............ F21V 7/0008
(Continued)

FOREIGN PATENT DOCUMENTS

CN 204554511 U * 8/2015
EP 2865939 A1 4/2015
(Continued)

OTHER PUBLICATIONS

Optical design of single plano-convex freeform lens-based illumination system for color filter liquid crystal on silicon pico projectors (Year: 2012).*
(Continued)

*Primary Examiner* — Thien T Mai
(74) *Attorney, Agent, or Firm* — NIXON & VANDERHYE

(57) ABSTRACT

An optical device (201) comprises a center portion (203) and a reflector portion (204) surrounding the center portion and comprising a reflector surface (205) configured to provide total internal reflection. The center portion comprises a first lens section (206) and a second lens section (207) after the first lens section in a propagation direction of light. A projection of a light ingress surface (208) of the first lens section on a geometric plane (xy) perpendicular to a geometric line (z) through center of mass points of the first and second lens sections is smaller than a corresponding projection of a light ingress surface (210) of the second lens section on the geometric plane. As there are the two successive lens sections, a desired collimation effect can be achieved even if the lens sections are sufficiently thin from the viewpoint of manufacturing.

20 Claims, 3 Drawing Sheets

(56) References Cited

U.S. PATENT DOCUMENTS

| | | | | |
|---|---|---|---|---|
| 2002/0034079 | A1 | 3/2002 | Becker et al. | |
| 2003/0007359 | A1 * | 1/2003 | Sugawara | F21V 5/00 362/326 |
| 2014/0022794 | A1 | 1/2014 | Laukkanen | |
| 2014/0078726 | A1 | 3/2014 | Tsai | |
| 2021/0018164 | A1 | 1/2021 | Bremerich | |

FOREIGN PATENT DOCUMENTS

| | | | | | |
|---|---|---|---|---|---|
| EP | 3263981 | A1 | | 1/2018 | |
| JP | 2019121492 | A | | 7/2019 | |
| KR | 20140006158 | A | * | 1/2014 | F21V 5/04 |
| WO | 2020208292 | A1 | | 10/2020 | |

OTHER PUBLICATIONS

A design of compound tailored illumination by a total-internal-reflection lens for machine vision (Year: 2021).*
International Search Report for PCT/FI2023/050309 dated Aug. 21, 2023, 3 pages.
Written Opinion of the ISA for PCT/FI2023/050309 dated Aug. 21, 2023, 4 pages.
Fl Search Report for FI20225496 dated Jan. 12, 2022, 2 pages.

* cited by examiner

OPTICAL DEVICE FOR MODIFYING A LIGHT DISTRIBUTION AND A METHOD FOR MANUFACTURING THE SAME

CROSS-REFERENCE TO RELATED APPLICATIONS

This application is the U.S. national phase of International Application No. PCT/FI2023/050309 filed Jun. 1, 2023 which designated the U.S. and claims priority to FI 20225496 filed Jun. 7, 2022, the entire contents of each of which are hereby incorporated by reference.

FIELD OF THE DISCLOSURE

The disclosure relates generally to illumination engineering. More particularly, the disclosure relates to an optical device for modifying a distribution of light produced by a light source that may comprise, for example but not necessarily, one or more light emitting diodes "LED". Furthermore, the disclosure relates to a light fixture comprising a light source and an optical device configured to modify a distribution of light produced by the light source. Furthermore, the disclosure relates to a method for manufacturing an optical device.

BACKGROUND

Distribution of light produced by a light source can be important or even critical in some applications. The light source may comprise, for example but not necessarily, one or more light emitting diodes "LED", one or more filament lamps, or one or more gas-discharge lamps. The distribution of light produced by a light source can be modified with optical devices such as lenses, reflectors, and combined lens-reflector devices which comprise a portion which acts as a lens and a portion which acts as a reflector. FIG. 1 shows a section view of an exemplifying light fixture that comprises a light source 102 and an optical device 101 according to the prior art. The optical device 101 is configured to modify a distribution of light emitted by the light source 102. Exemplifying light beams are depicted with dashed line arrows in FIG. 1. The optical device 101 can be for example rotationally symmetric with respect to the z-axis of a coordinate system 199. In this exemplifying case, the light source 102 is a light emitting diode "LED" that comprises a semiconductor part 130 emitting blue light and yellow phosphorus 131 that converts the blue light into white light having a plurality of wavelengths.

The optical device 101 is made of transparent material, and the optical device 101 comprises a center portion 103 and a reflector portion 104 surrounding the center portion 103. The reflector portion 104 comprises a reflector surface 105 configured to provide total internal reflection "TIR". The center portion 103 comprises a lens section 106 configured to collimate light that penetrates the lens section 106. An inconvenience related to the optical device 101 is that the collimating lens section 106 needs to be quite thick to achieve a sufficient collimation effect, but, on the other hand, the thick lens section 106 complicates the manufacture of the optical device 101.

SUMMARY

The following presents a simplified summary to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments.

In this document, the word "geometric" when used as a prefix means a geometric concept that is not necessarily a part of any physical object. The geometric concept can be for example a geometric point, a geometric line, a geometric curve, a geometric plane, a non-planar geometric surface, a geometric space, or any other geometric entity that is zero, one, two, or three dimensional.

In accordance with the invention, there is provided a new optical device for modifying a distribution of light produced by a light source.

An optical device according to the invention comprises a center portion and a reflector portion surrounding the center portion and comprising a reflector surface configured to provide total internal reflection "TIR". The center portion comprises a first lens section comprising a first light ingress surface and a first light egress surface, and a second lens section successively with the first lens section and comprising a second light ingress surface and a second light egress surface so that the second light ingress surface is facing towards the first light egress surface. Sizes of the first and second light ingress surfaces are such that a projection of the first light ingress surface on a geometric plane perpendicular to a geometric line through center of mass points of the first and second lens sections is smaller than a projection of the second light ingress surface on the geometric plane. The projections are considered instead of the first and second light ingress surfaces, because areas of the projections are independent of possible non-planarity of the first and/or second light ingress surfaces, and thereby the projections describe better the scopes of areas through which the first and second lens sections receive light.

As there are the above-mentioned first and second successive lens sections and the sizes of the light ingress surfaces of the lens sections are designed in the above-described way, a desired collimation effect can be achieved even if the lens sections are sufficiently thin from the viewpoint of manufacturing. It is also possible that there are more than two successive lens sections in the center portion of an optical device according to an exemplifying and non-limiting embodiment.

In accordance with the invention, there is also provided a new light fixture that comprises:

- a light source, and
- an optical device according to the invention and configured to modify a distribution of light emitted by the light source.

The light source is located symmetrically with respect to the geometric line through the center of mass points of the first and second lens sections of the optical device. The light source may comprise for example one or more light emitting diodes "LED".

In accordance with the invention, there is also provided a new method for manufacturing an optical device according to the invention. The method comprises:

- manufacturing a first transparent piece constituting the reflector portion and the first lens section of the optical device,
- manufacturing a second transparent piece constituting the second lens section of the optical device, and
- attaching the second transparent piece to the first transparent piece so that the second lens section is successively with the first lens section, and the second light ingress surface of the second lens section is facing towards the first light egress surface of the first lens section.

The above-mentioned first and second transparent pieces can be manufactured for example by mold casting. The second transparent piece can be attached to the first transparent piece using for example ultrasound welding, glue, a mechanical shape locking, threads, a friction fitting, and/or some other suitable fastening method. The first transparent piece can be made of for example acrylic plastic, polycarbonate, optical silicone, or glass. Correspondingly, the second transparent piece can be made of for example acrylic plastic, polycarbonate, optical silicone, or glass. The first and second transparent pieces can be made of same transparent material, or they can be made of different transparent materials.

Various exemplifying and non-limiting embodiments are described in accompanied dependent claims.

Exemplifying and non-limiting embodiments both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features.

The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below with reference to the accompanying drawings, in which:

FIG. 1 has already been explained in the Background-section of this document.

DESCRIPTION OF EXEMPLIFYING AND NON-LIMITING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
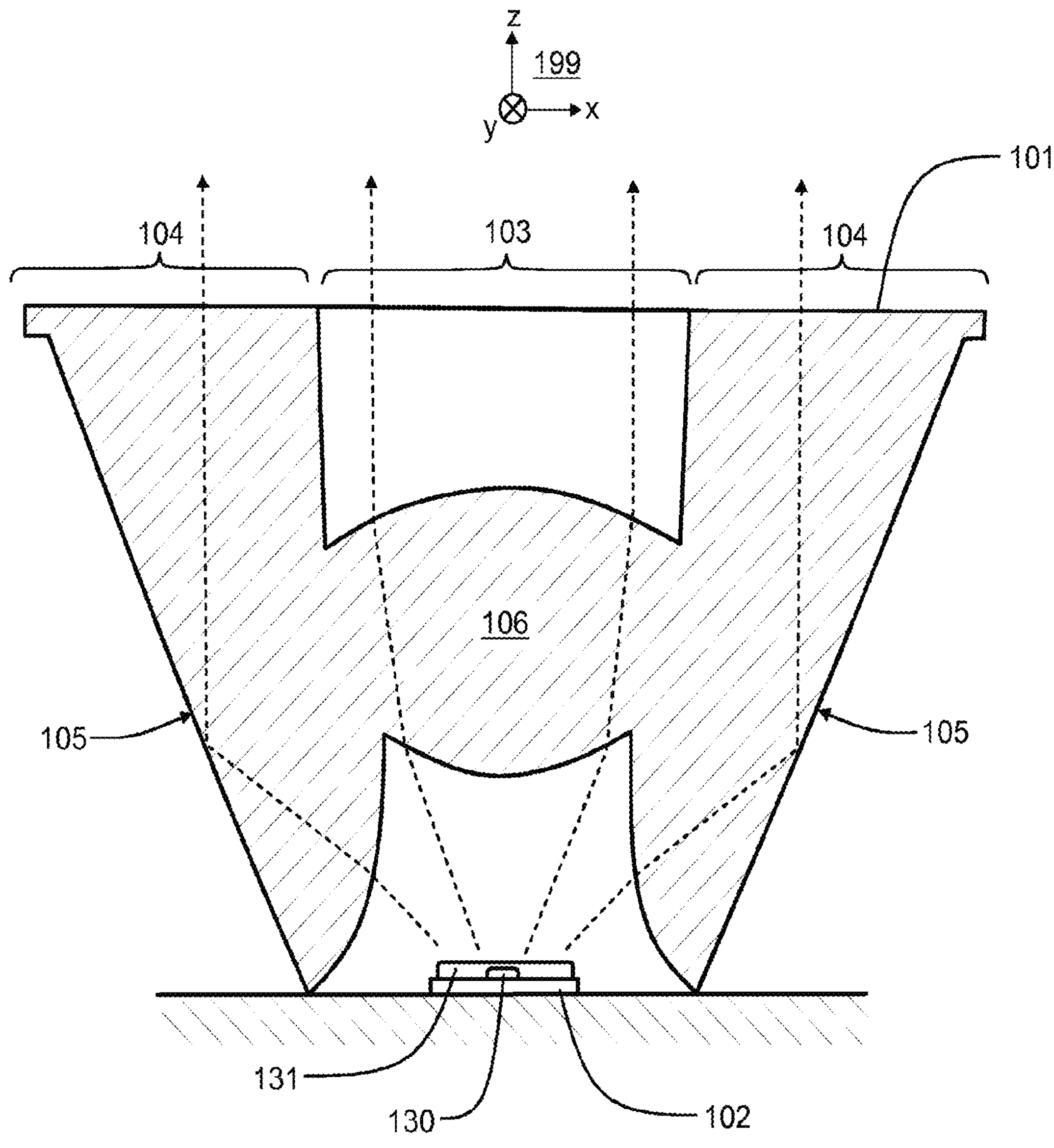
Figure 1 Prior art
FIG. 1 illustrates a light fixture that comprises a light source and an optical device according to the prior art for modifying a light distribution.
Figure 2:
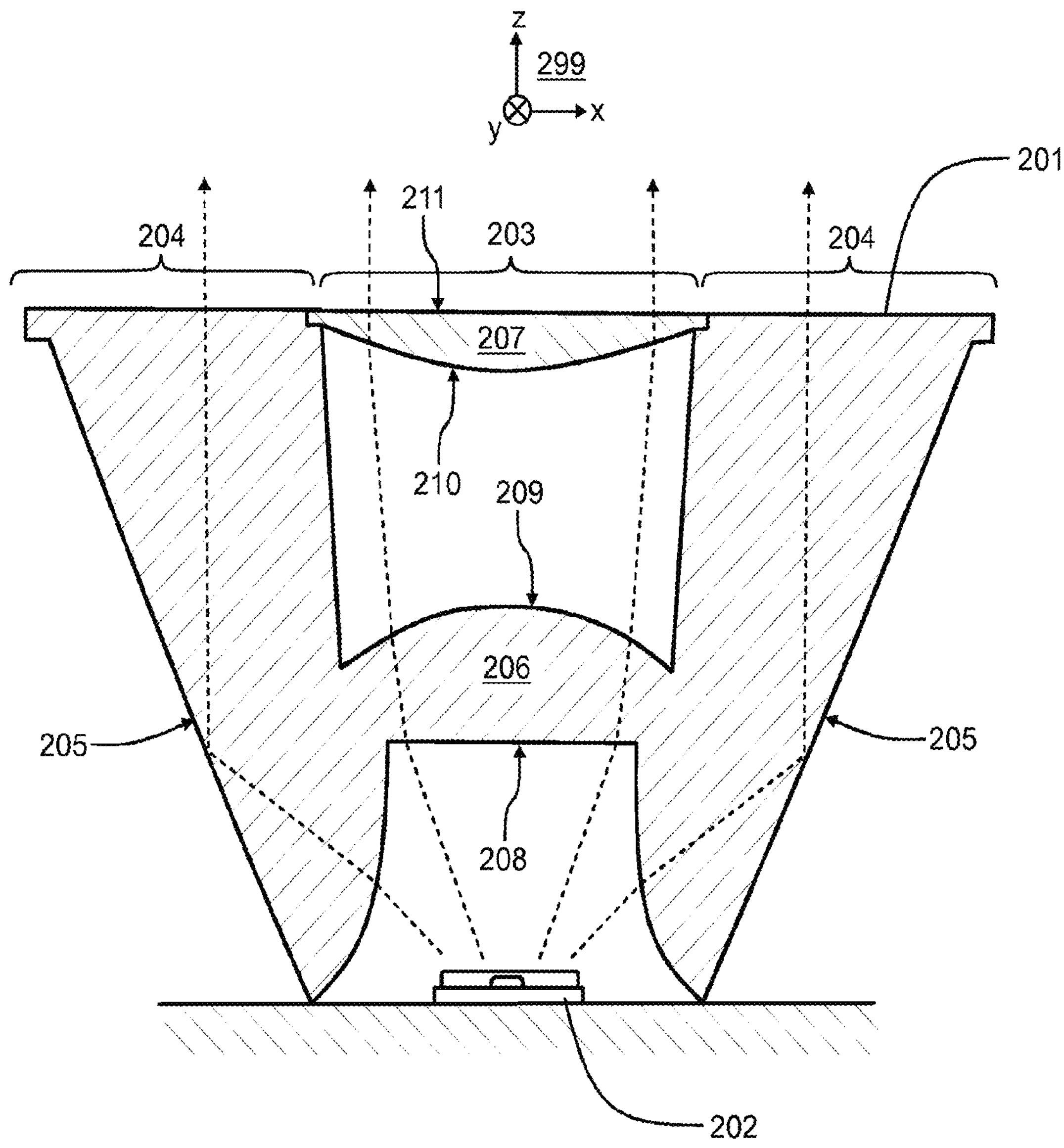
FIG. 2 illustrates a light fixture that comprises a light source and an optical device according to an exemplifying and non-limiting embodiment for modifying a light distribution.

FIG. 2 illustrates an optical device 201 according to an exemplifying and non-limiting embodiment. The optical device 201 is configured to modify a distribution of light emitted by a light source 202. The light source 202 can be for example a light emitting diode "LED" that comprises a semiconductor part emitting blue light and yellow phosphorus that converts the blue light into white light having a plurality of wavelengths. In FIG. 2, exemplifying light beams are depicted with dashed line arrows.

In FIG. 2, the optical device 201 is shown as a section view so that the geometric section plane is parallel with the geometric xz-plane of a coordinate system 299. The optical device 201 can be for example rotationally symmetric with respect to the z-axis of the coordinate system 299. For another example, an optical device according to an embodiment of the invention can be an elongated element so that a section of the kind shown in FIG. 2 is a cross-section of the optical device and the cross-section is the same over a longitudinal length perpendicular to the geometric section plane. The optical device 201 comprises a center portion 203 and a reflector portion 204 that surrounds the center portion 203. The reflector portion 204 comprises a reflector surface 205 configured to provide total internal reflection "TIR". The center portion 203 comprises a first lens section 206 and a second lens section 207 that is successively with the first lens section 206. The first lens section 206 has a first light ingress surface 208 and a first light egress surface 209. The second lens section 207 comprises a second light ingress surface 210 and a second light egress surface 211 so that the second light ingress surface 210 is facing towards the first light egress surface 209. Sizes of the first and second light ingress surfaces 208 and 210 are such that a projection of the first light ingress surface 208 on the geometric xy-plane of the coordinate system 299 is smaller than a projection of the second light ingress surface 210 on the geometric xy-plane of the coordinate system 299. The above-mentioned projection of the second light ingress surface 210 can be for example at least 10% larger than the above-mentioned projection of the first light ingress surface 208.

In the exemplifying optical device 201, a projection of the first light egress surface 209 on the geometric xy-plane of the coordinate system 299 is larger than the projection of the first light ingress surface 208 on the geometric plane xy-plane, and a cavity between the first and second lens sections 206 and 207 has an expanding shape so that the projection of the second light ingress surface 210 on the geometric xy-plane of the coordinate system 299 is larger than the projection of the first light egress surface 209 on the geometric xy-plane of the coordinate system 299.

In the exemplifying optical device 201, the first light ingress surface 208 is planar, the first light egress surface 209 is convex, the second light ingress surface 210 is convex, and the second light egress surface 211 is planar. It is also possible that in an optical device according to an exemplifying and non-limiting embodiment, one or more of the light ingress surfaces and/or the light egress surfaces of the first and second lens sections is/are a Fresnel-lens surface.

In the exemplifying optical device 201, the reflector portion 204 and the first lens section 206 constitute a first transparent piece made of first transparent material and the second lens section 207 constitutes a second transparent piece made of second transparent material. The first transparent material can be for example acrylic plastic, polycarbonate, optical silicone, or glass. Correspondingly, the second transparent material can be for example acrylic plastic, polycarbonate, optical silicone, or glass. The first and second transparent pieces can be made of same transparent material, or the first and second transparent pieces can be made of different transparent materials.

The optical device 201 and the light source 202 constitute a light fixture according to an exemplifying and non-limiting embodiment. The light source 202 is mechanically supported with respect to the optical device 201 so that the light source 202 is located symmetrically with respect to the geometric z-axis of the coordinate system 299.

Figure 3:
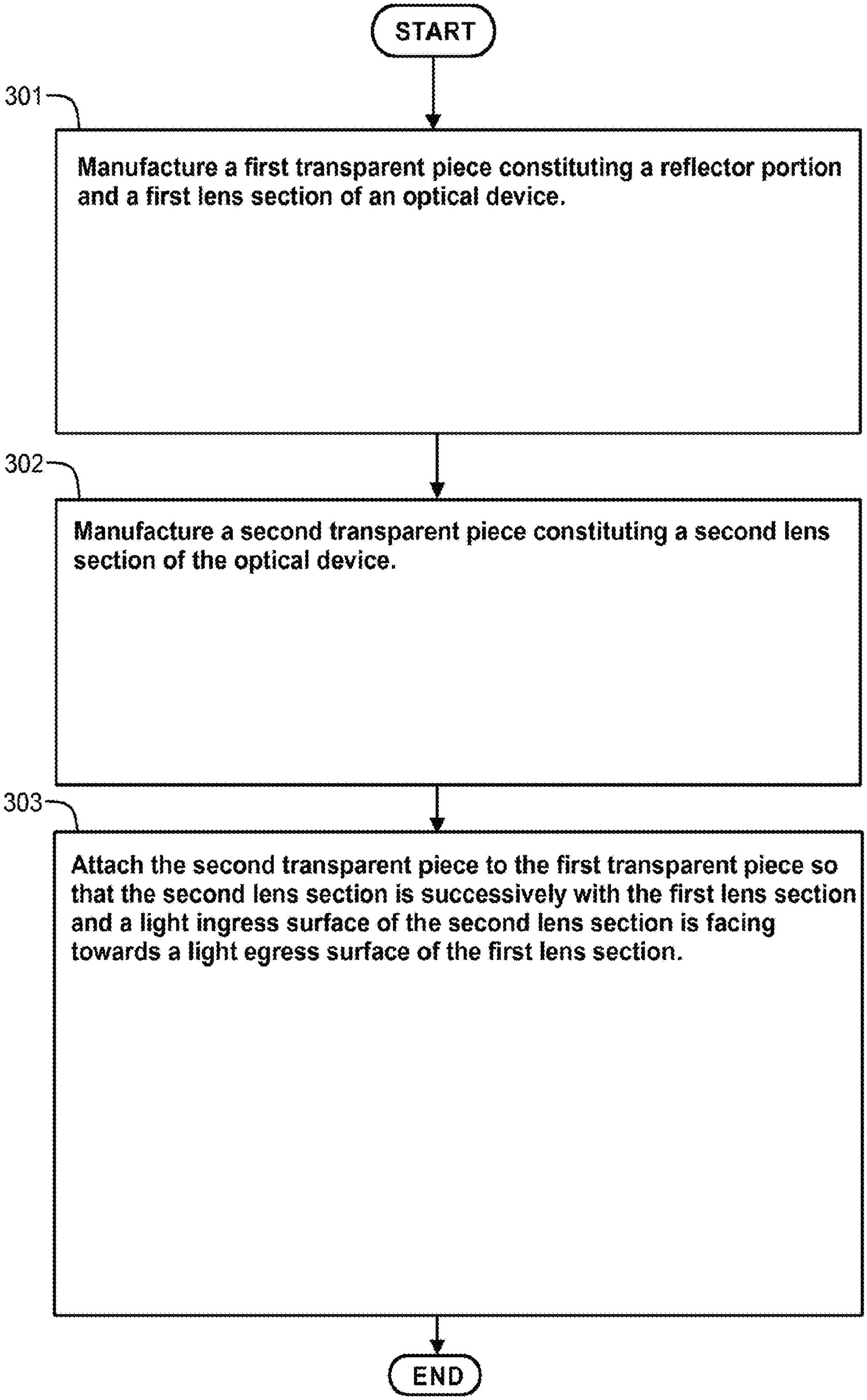
FIG. 3 shows a flowchart of a method according to an exemplifying and non-limiting embodiment for manufacturing an optical device.

FIG. 3 shows a flowchart of a method according to an exemplifying and non-limiting embodiment for manufacturing an optical device that can be for example such as the optical device 201 illustrated in FIG. 2. The method comprises the following actions:

action 301: manufacturing a first transparent piece constituting the reflector portion and the first lens section of the optical device, action 302: manufacturing a second transparent piece constituting the second lens section of the optical device, and action 303: attaching the second transparent piece to the first transparent piece so that the second lens section is successively with the first lens section and the second light ingress surface of the second lens section is facing towards the first light egress surface of the first lens section In a method according to an exemplifying and non-limiting embodiment, the above-mentioned first transparent piece is manufactured by mold casting, and the above-mentioned second transparent piece is manufactured by mold casting.

In a method according to an exemplifying and non-limiting embodiment:

the above-mentioned first transparent piece is made of one of the following: acrylic plastic, polycarbonate, optical silicone, glass, and the above-mentioned second transparent piece is made of one of the following: acrylic plastic, polycarbonate, optical silicone, glass.

In a method according to an exemplifying and non-limiting embodiment, the second transparent piece is attached to the first transparent piece using at least one of the following: ultrasound welding, glue, a mechanical shape locking, threads, and/or a friction fitting.

The specific examples provided in the description given above should not be construed as limiting the scope and/or the applicability of the appended claims. Lists and groups of examples provided in the description given above are not exhaustive unless otherwise explicitly stated.

What is claimed is:

1. An optical device for modifying a light distribution, the optical device comprising:

a center portion comprising:

a first lens section comprising a first light ingress surface and a first light egress surface; and a second lens section successively with the first lens section and comprising a second light ingress surface and a second light egress surface, the second light ingress surface facing towards the first light egress surface, wherein a projection of the first light ingress surface on a geometric plane perpendicular to a geometric line through a center of mass points of the first and second lens sections is smaller than a projection of the second light ingress surface on the geometric plane; and a reflector portion surrounding the center portion and comprising a reflector surface configured to provide total internal reflection, wherein the reflector portion and the first lens section are configured as a first transparent piece made of a first transparent material, wherein the second lens section is a second transparent piece made of a second transparent material and attached to the first transparent piece, and wherein the second light ingress surface is arranged to be a distance away from the first light egress surface.

2. The optical device according to claim 1, wherein a projection of the first light egress surface on the geometric plane is larger than the projection of the first light ingress surface on the geometric plane.

3. The optical device according to claim 1, wherein the projection of the second light ingress surface on the geometric plane is larger than a projection of the first light egress surface on the geometric plane.

4. The optical device according to claim 1, wherein the first light ingress surface is planar, and the first light egress surface is convex.

5. The optical device according to claim 1, wherein the second light ingress surface is convex, and the second light egress surface is planar.

6. The optical device according to claim 1, wherein the first transparent material is one of: acrylic plastic, polycarbonate, optical silicone, and glass.

7. The optical device according to claim 1, wherein the second transparent material is one of: acrylic plastic, polycarbonate, optical silicone, and glass.

8. The optical device according to claim 1, wherein the optical device is rotationally symmetric with respect to the geometric line through the center of mass points of the first and second lens sections.

9. The optical device according to claim 1, wherein the projection of the second light ingress surface on the geometric plane is at least 10% larger than the projection of the first light ingress surface on the geometric plane.

10. A light fixture comprising:

a light source; and an optical device configured to modify a distribution of light emitted by the light source, the optical device comprising:

a center portion comprising:

a first lens section comprising a first light ingress surface and a first light egress surface; and a second lens section successively with the first lens section and comprising a second light ingress surface and a second light egress surface, the second light ingress surface facing towards the first light egress surface, wherein a projection of the first light ingress surface on a geometric plane perpendicular to a geometric line through a center of mass points of the first and second lens sections is smaller than a projection of the second light ingress surface on the geometric plane; and a reflector portion surrounding the center portion and comprising a reflector surface configured to provide total internal reflection, wherein the reflector portion and the first lens section constitute a first transparent piece made of first transparent material, wherein the second lens section constitutes a second transparent piece made of second transparent material and attached to the first transparent piece, wherein the second light ingress surface is a distance away from the first light egress surface, and wherein the light source is located symmetrically with respect to the geometric line.

11. A method for manufacturing an optical device that comprises a center portion and a reflector portion surrounding the center portion and comprising a reflector surface configured to provide total internal reflection, the center portion comprising a first lens section comprising a first light ingress surface and a first light egress surface, wherein the center portion comprises a second lens section successively with the first lens section and comprising a second light ingress surface and a second light egress surface, the second light ingress surface facing towards the first light egress surface, wherein a projection of the first light ingress surface on a geometric plane perpendicular to a geometric line through center of mass points of the first and second lens sections is smaller than a projection of the second light ingress surface on the geometric plane, the method comprising:

manufacturing a first transparent piece constituting the reflector portion and the first lens section of the optical device, manufacturing a second transparent piece constituting the second lens section of the optical device, and attaching the second transparent piece to the first transparent piece so that:

the second lens section is successively with the first lens section, the second light ingress surface of the second lens section is facing towards the first light egress surface of the first lens section, and the second light ingress surface is a distance away from the first light egress surface.

12. The method according to claim 11, wherein the first transparent piece is manufactured by mold casting, and the second transparent piece is manufactured by mold casting.

13. The method according to claim 11, wherein:

the first transparent piece comprises one of: acrylic plastic, polycarbonate, optical silicone, and glass, and the second transparent piece comprises one of: acrylic plastic, polycarbonate, optical silicone, and glass.

14. The method according to claim 11, wherein the second transparent piece is attached to the first transparent piece using at least one of: ultrasound welding, glue, a mechanical shape locking, threads, and a friction fitting.

15. The optical device according to claim 2, wherein the projection of the second light ingress surface on the geometric plane is larger than a projection of the first light egress surface on the geometric plane.

16. The optical device according to claim 2, wherein the first light ingress surface is planar, and the first light egress surface is convex.

17. The optical device according to claim 3, wherein the first light ingress surface is planar, and the first light egress surface is convex.

18. The optical device according to claim 2, wherein the second light ingress surface is convex, and the second light egress surface is planar.

19. The optical device of claim 1, wherein the first transparent material is different from the second transparent material.

20. The optical device of claim 10, wherein the first transparent material is different from the second transparent material.

* * * * *